Dec. 17, 1968   R. CHAPMAN   3,416,484
PARKING STALL FENDER
Filed March 30, 1966   2 Sheets-Sheet 1
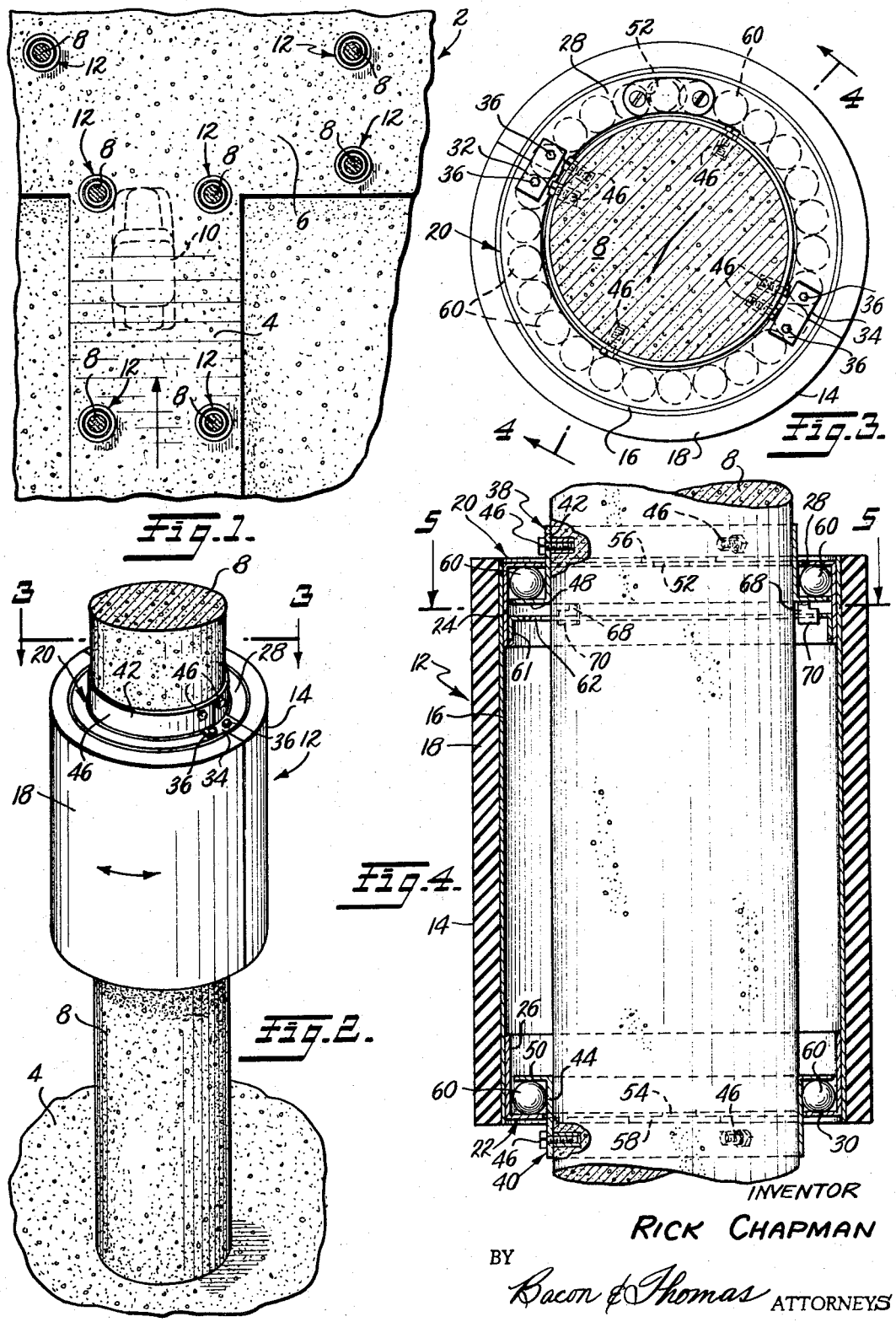
INVENTOR
RICK CHAPMAN
BY
Bacon & Thomas ATTORNEYS Dec. 17, 1968   R. CHAPMAN   3,416,484
PARKING STALL FENDER Filed March 30, 1966   2 Sheets-Sheet 2

INVENTOR
RICK CHAPMAN

BY *Bacon & Thomas*
ATTORNEYS

United States Patent Office 3,416,484
Patented Dec. 17, 1968

3,416,484
PARKING STALL FENDER
Rick Chapman, Illikai Hotel, Room 1409, 1777 Ala
Moana Blvd., Honolulu, Hawaii 96815
Filed Mar. 30, 1966, Ser. No. 538,665
5 Claims. (Cl. 116—67)

ABSTRACT OF THE DISCLOSURE

A fender assembly for mounting on a column in a vehicle parking area, including a cylindrical drum rotatably mounted concentrically on said column in spaced relationship by bearing means near each end of the drum. The bearing means extend across the space between the column and the drum to prevent radial shifting of the drum, and are designed to prevent axial shifting of the drum in either direction. A ring gear and ratchet element are mounted between the drum and the column, to give an audible signal when the drum is rotated by a moving automobile in engagement therewith.

---

This invention relates to a fender assembly for mounting on structural columns located adjacent to automobile parking stalls and in areas where vehicles are driven about, designed to minimize damage to any vehicle coming into contact therewith.

The use of enclosed garages and the like for parking large numbers of automotive vehicles has become widespread, such frequently having structural columns located immediately next to parking stalls and in open areas where vehicles are to be driven about. It frequently happens that an operator, while entering or leaving a parking stall or in the course of driving a vehicle around within the garage, will drive too close to such a column with the result that paint may be scraped from the vehicle, or other damage done thereto.

It is the principal object of the present invention to provide a fender assembly for mounting on structural columns and the like, constructed to minimize damage to any vehicle that comes in contact therewith.

Another object is to provide a cylindrical drum fender constructed to be rotatably mounted on a column or the like, and which will rotate when engaged by a moving motor vehicle so as to substantially eliminate the possibility of damage to the vehicle from scraping action.

A further object is to provide a rotatably mounted cylindrical drum fender having a resilient cushion surface that will minimize damage to any portion of a vehicle coming in contact therewith.

Still another object is to provide a rotatably mounted cylindrical drum fender for mounting on a column or the like, equipped with means for immediately generating a warning noise when said fender is rotated by a moving vehicle coming into engagement therewith.

Yet another object is to provide a cylindrical drum fender constructed so that it can be easily installed on existing structural columns of various cross-sectional shapes.

Other objects and many of the attendant advantages of the present invention will become readily apparent from the following detailed description, when taken in consideration with the accompanying drawings, wherein:

FIG. 1 is a fragmentary floor plan view of a parking garage structure having a plurality of cylindrical supporting columns, each of said columns having a fender assembly mounted thereon;

FIG. 2 is an enlarged perspective view of the fender assembly of the invention, shown mounted on one of the cylindrical columns of FIG. 1;

FIG. 3 is a top view of the fender assembly, taken along the line 3—3 in FIG. 2;

FIG. 4 is a vertical sectional view taken along the line 4—4 in FIG. 3, showing the details of construction of the fender assembly;

Figure 5:
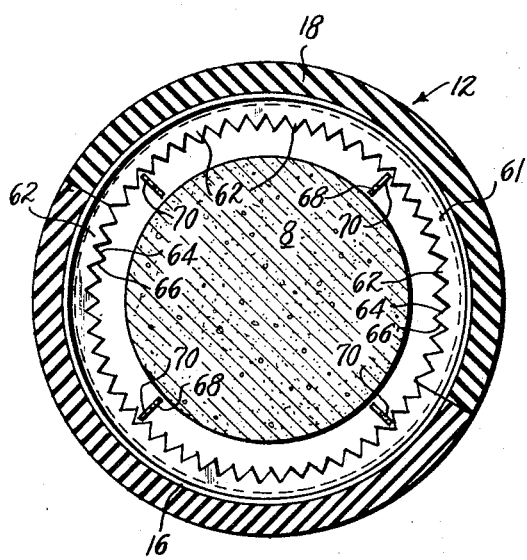
FIG. 5 is a horizontal sectional view taken along the line 5—5 in FIG. 4, showing the ring gear and rachet elements for generating a warning noise upon rotation of the cylindrical drum fender.

Referring now to the drawings, a parking garage structure is indicated generally at 2 in FIG. 1, and includes a vehicle driveway 4 leading to a parking stall area 6, the garage structure including a plurality of cylindrical supporting columns 8 past which an automobile 10 must be driven when entering or leaving the parking stall area 6. Each of the columns 8 has a fender assembly 12 mounted thereon, designed to minimize damage to any vehicle coming in contact therewith.

Referring now in particular to FIGS. 2–5, wherein is illustrated the preferred embodiment of the invention, the fender assembly 12 includes a cylindrical drum fender 14 rotatably mounted on the column 8, and which is split axially along a diameter thereof to form two identical semi-cylindrical sections. The cylindrical drum 14 includes a metallic cylindrical core 16 having a relatively thick, say about 1 inch, cushion 18 of rubber or other suitable resilient material bonded to the external surface thereof.

Welded to the internal surface of the metallic core 16 at the opposite ends thereof are outer bearing races 20 and 22, which are axially split along a diameter thereof. The outer races 20 and 22 include inwardly extending cylindrical portions 24 and 26 that terminate at their outer ends in radially extending flanges 28 and 30, respectively. The two halves of the cylindrical drum fender 14 are held in assembled relationship by an upper pair of shackles 32 and 34, which are secured to the flange 28 by screws 36 to bridge the mating edges of the two sections of said flange, and by a pair of similar shackles (not shown) secured to the lower flange 30.

Mounted on the cylindrical column 8 is a pair of spaced, inner bearing races 38 and 40, each of which is axially split along a diameter thereof. The inner bearing races 38 and 40 include cylindrical portions 42 and 44, respectively, which are each secured to the cylindrical column 8 by circumferentially spaced bolts 46, three of the bolts 46 being used to secure each semi-cylindrical portion of the races. The inner ends of the cylindrical portions 42 and 44 terminate in outwardly directed radial flanges 48 and 50, which are positioned between and spaced from the flanges 28 and 30, respectively.

Before the cylindrical drum fender 14 is assembled on the cylindrical column 8, the inner bearing races 38 and 40 are installed. With the shackles 32 and 34, and the corresponding lower shackles (not shown) removed, the two halves of the cylindrical drum fender 14 are then positioned about the column 8, with the flanges 48 and 50 of the inner bearing races 38 and 40 positioned between the flanges 28 and 30 of the outer bearing races 20 and 22. The shackles are then installed to couple together the two halves of the cylindrical drum fender 14.

The flanges 28 and 30 of the outer bearing races 20 and 22 have openings 52 and 54 therein, respectively, which normally are covered by plates 56 and 58 secured in position by screws. After the cylindrical drum fender 14 is mounted about the column 8 and the inner bearing races 38 and 40, the cover plates 56 and 58 are removed and ball bearing elements 60 are inserted into the space between the inner and outer races. When a sufficient number of ball bearings 60 have been inserted, the cover plates 56 and 58 are reinstalled to close the openings 52 and 54.

It is to be understood that the openings 52 and 54 constitute but one expedient by which the ball bearings 60 can be assembled between the inner and outer bearing races. Other means and methods of assembling the ball bearing elements 60 can be utilized, without departing from the invention.

It will be noted that the flanges 28 and 30 of the outer bearing races 20 and 22 have radial extents such that the inner peripheries thereof are out of contact with the portions 42 and 44 of the inner bearing races 38 and 40, and that similarly the flanges 48 and 50 of the inner bearing races 38 and 40 are spaced from the portions 24 and 26 of the outer bearing races 20 and 22. Further, the flanges 28 and 30 are spaced from the flanges 48 and 50, respectively, by a distance substantially equal to the radial distance between the confronting surfaces of the cylindrical portions of the inner and outer races. The diameter of the ball bearing elements 60 is just slightly less than this spacing, with the result that the cylindrical drum fender 14 is mounted for free rotation on the cylindrical column 8, and against movement axially thereof.

Thus, when a moving motor vehicle engages the outer surface of the cylindrical drum fender 14 it will rotate freely about the column 8, thereby eliminating relative scraping action between the fender and said vehicle, and minimizing the possibility of scraping the paint finish on the vehicle. Further, in instances except those of direct head-on impact, the freely rotatable cylindrical drum fender 14 will tend to somewhat deflect a vehicle coming into engagement therewith whereby to further minimize structural damage thereto. The relatively thick, resilient cushion 18 also functions to minimize damage to a vehicle coming into contact with the fender assembly 12.

Welded to the cylindrical portion 24 of the outer bearing race 20 inwardly of the flange 48 is an axially split ring gear 61 having triangular gear teeth 62 on the inner surface thereof, the sides 64 and 66 of each tooth being inclined at substantially the same angle from a radial line passing through the peak of the tooth. Mounted on the lower face of the flange 48 of the inner bearing race 38 are four circumferentially spaced ratchet elements 68, each including a resilient arm portion 70 engaged with the teeth 62. Thus, when the cylindrical drum fender 14 is rotated about the column 8 in either direction, the ratchet elements 68 carried by the column 8 and the teeth 62 of the ring gear 61 carried by the drum 14 are effective to generate a warning noise, which noise is enhanced by the annular resonating chamber defined between the inner cylindrical surface of the drum 14 and the outer surface of the column 8. This ratchet noise is sufficient to warn the driver of a moving vehicle that the vehicle is in contact with the cylindrical drum fender 14, and is thus in danger of being damaged. It is to be understood that the relative positions of the ring gear 61 and the ratchet elements 68 can be reversed, and that additional ring gears and ratchet elements can be employed to generate louder warning sounds, all without departing from the invention.

Figure 6:
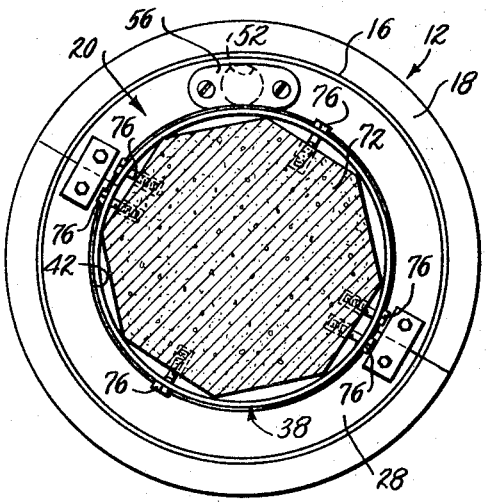
FIG. 6 is a view similar to FIG. 3, but showing the fender assembly mounted on a column having an octangular cross-section.
Figure 7:
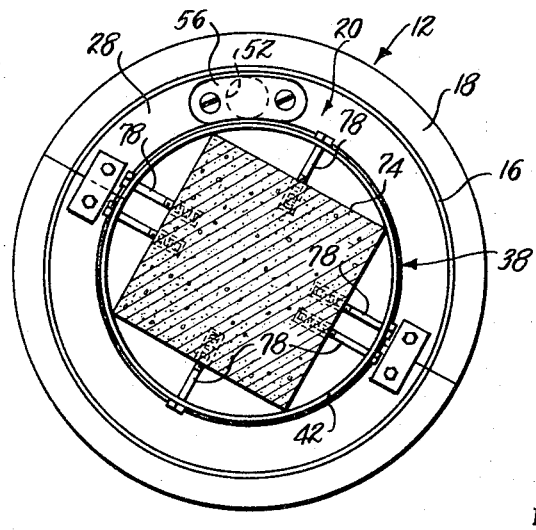
FIG. 7 is a view similar to FIG. 3, but showing the fender assembly mounted on a rectangular column.

It is seen that the fender assembly 12 can readily be installed about a cylindrical column 8. In a like manner, the assembly can be installed about an octangular column 72, as shown in FIG. 6, or about a rectangular column 74, as shown in FIG. 7. In the first instance the inner bearing races 38 and 40 are secured to the column 72 by elongated bolts 76, corresponding to the bolts 46, and in the second instance they are secured to the column 74 by even longer bolts 78. In both FIGS. 6 and 7, the fender assembly 12 functions iedntically as in FIGS. 1–5.

By positioning the flanges 48 and 50 of the inner bearing races 38 and 40 between the flanges 28 and 30 of the outer bearing races 20 and 22, the cylindrical drum fender 14 is prevented from shifting axially on the column 8. This feature can also be obtained by reversing the positions of the flanges, such an arrangement being shown in FIG. 8.

Figure 8:
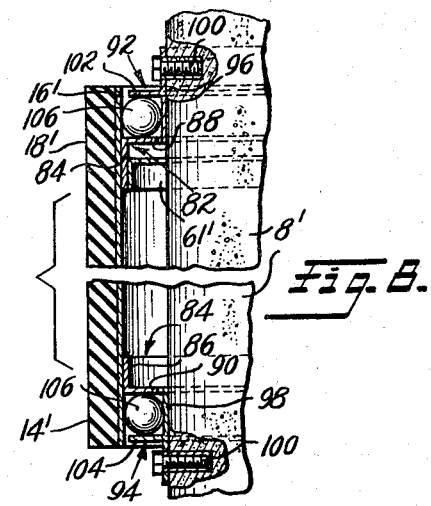
FIG. 8 is a view similar to FIG. 4, showing a modification of the invention wherein the bearing race flanges carried by the cylindrical drum are positioned between the bearing race flanges carried by the column.

Referring to FIG. 8, a cylindrical drum fender 14' is shown mounted on a cylindrical column 8', and includes an axially split cylindrical metal core 16' having a thick resilient cushion 18' bonded to the external surface thereof. Welded to the inner surface of the metallic core 16' inwardly from the ends thereof are axially split outer bearing races 80 and 82, including cylindrical portions 84 and 86 terminating at their outer ends in radially extending flanges 88 and 90, respectively. Mounted on the column 8' is a pair of axially split inner bearing races 92 and 94, each including a cylindrical portion 96 and 98, respectively, secured near their outer ends to the column 8' by bolts 100. The inner ends of the cylindrical portions 96 and 98 extend inwardly to the region of the flanges 88 and 90, and said cylindrical portions have centrally positioned, radially extending flanges 102 and 104, respectively, thereon disposed outwardly of said flanges 88 and 90. Ball bearings 106 are received between the flanges 88 and 102, and between the flanges 90 and 104, and the cylindrical drum fender 14' is thus mounted for free rotation on the column 8', while at the same time being restrained against axial shifting thereon. A ring gear 61' is welded to the cylindrical portion 84 of the outer bearing race 82, and cooperates with rachet elements (not shown) carried by the inner bearing race 92.

The dimensions for the cylindrical drum fenders 14 and 14' can vary, but it has been found that they should have an overall height of about 30 inches, and that they should be positioned vertically on the column 8 so that their centers are positioned about 28 inches above the floor. When thus dimensioned and mounted, the cylindrical drum fenders will be effective to protect and minimize damage to automotive vehicles of nearly any size.

Obviously, many modifications and variations of the present invention are possible in the light of the above teachings. It is, therefore, to be understood that within the scope of the appended claims the invention may be practiced otherwise than as specifically shown and described.

I claim:

1. In a vehicle parking area, a column; a cylindrical drum fender disposed to encircle said column; bearing means near each end of said cylindrical drum fender between said column and said cylindrical drum fender for mounting said fender on said column for rotation thereabout, and against axial movement along the length of said column, said cylindrical drum fender being radially spaced from said column to define an annular space therebetween, and said bearing means extending across said annular space and engaging both said column and said cylindrical drum fender to substantially prevent any radial movement of said drum fender toward or away from said column; and means between said cylindrical drum fender and said column effective to generate a warning noise when said fender is rotated in either direction about said column, comprising: a ring gear carried by one of said cylindrical drum fender and said column; and at least one resilient ratchet element carried by the other of said cylindrical drum fender and said column, and engaged with the teeth of said ring gear.

2. The invention as recited in claim 1, wherein said bearing means comprises: a first pair of axially spaced bearing races secured to one of said column and the inner surface of said cylindrical drum fender, each race of said first pair of races including a radial flange; a second pair of axially spaced bearing races secured to the other of said column and the inner surface of said cylindrical drum fender, each race of said second pair of races including a radial flange, the flanges of said second pair of races being disposed between and being axially spaced from the flanges of said first pair of races; and a plurality of ball bearing elements received between the races of said first pair of races and the races of said second pair of races.

3. The invention as recited in claim 2, wherein said cylindrical drum fender, said ring gear, and all of said bearing races are axially split to facilitate assembly thereof about said column, and including means for securing said axially split cylindrical drum fender in assembled relationship about said column.

4. The invention as recited in claim 1, wherein said cylindrical drum fender comprises: a cylindrical core; and a cushion of resilient material bonded to the external surface of said cylindrical core.

5. The invention as recited in claim 2, wherein said annular space between said column and said cylindrical drum defines an annular resonating chamber said ring gear being positioned between said pairs of races within said annular resonating chamber.

References Cited
UNITED STATES PATENTS 3,104,875    9/1963    Doyle _____ 273—55

FOREIGN PATENTS 290,109    5/1928    Great Britain.

LOUIS J. CAPOZI, *Primary Examiner.*

U.S. Cl. X.R.

94—1.5; 114—220; 116—28